G. NELSON.
Wheel for Vehicles.

No. 161,980.    Patented April 13, 1875.

Attest:
E. J. Geisendorff.
James Dawson

Inventor:
George Nelson

UNITED STATES PATENT OFFICE.

GEORGE NELSON, OF LIVINGSTON, ASSIGNOR OF ONE-HALF HIS RIGHT TO HENRY C. PEDIGO, OF WOODVILLE, TEXAS.

IMPROVEMENT IN WHEELS FOR VEHICLES.

Specification forming part of Letters Patent No. 161,980, dated April 13, 1875; application filed July 27, 1874.

*To all whom it may concern:*

Be it known that I, GEORGE NELSON, of Livingston, in the county of Polk and State of Texas, have invented a certain Improvement in Carriage-Wheels, of which the following is a specification:

The nature of my invention, relating more especially to that kind of carriage-wheels in which the alternate spokes dish in opposite directions, consists in inserting the exterior set of spokes in a socketed ring fitting the hub or box of the wheel, and combining this socketed ring with an elastic washer placed between it and that portion of the hub which receives the tenons of the interior set of spokes, and a nut, by means of which the socketed ring can be forced up toward the inner set of spokes, so as to brace both sets of spokes firmly between the hub and the rim of the wheel.

Figure 1:
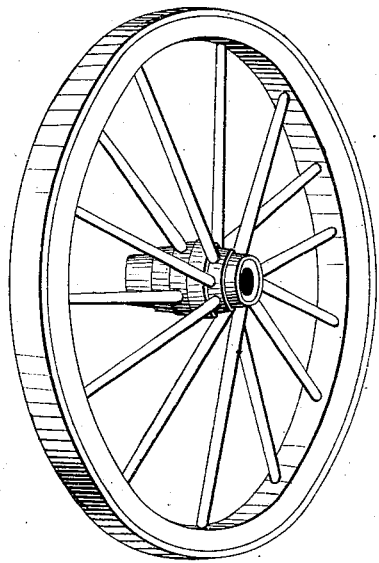
Figure 2:
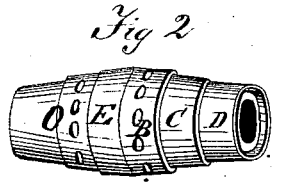
Figure 3:
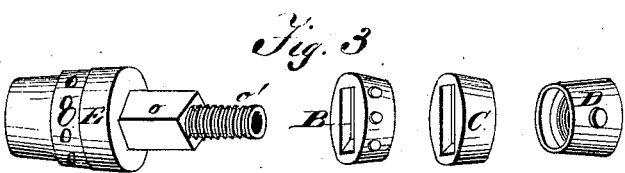
Figure 4:

In the annexed drawings, Figure 1 is a perspective view of my improved carriage-wheel. Fig. 2 is a perspective view of the hub detached. Fig. 3 illustrates in perspective the different parts of the hub separated from one another. Fig. 4 shows a wrench, such as may be used for tightening and unscrewing the nut.

The same letters of reference are used in all the figures in the designation of like parts.

The spokes *a* and alternate spokes *b* dish in opposite directions, the set *a* being inserted in suitable sockets in the part O of the hub, while those constituting the set *b* are tenoned in a socketed ring, B, which fits snugly on the squared portion *o* of the part O of the hub. An elastic washer or ring, E, is interposed between the socketed part O and the socketed ring B, so that while the space between the two portions mentioned is bridged by this ring, still the elasticity of the latter will admit of drawing or forcing the socketed ring B toward the socketed portion of part O, to tighten both sets of spokes should they become loose and rattling by shrinkage of the wood, or by expansion of the tire. A washer, C, is placed against the outer side of the socketed ring on the squared portion *o*, and then the nut D is screwed on the portion *o'*, bearing against the washer C, and forcing the socketed ring up until the spokes become firmly braced between the hub and the rim. The outer ends of the spokes are suitably fitted in sockets in the fellies, and the rim is tired as usual.

This construction of the wheel affords the greatest facility, both for setting it up originally, and for keeping it in a compact and tight condition without the necessity of cutting and rewelding the tire, or even shrinking the tire upon the rim.

What I claim as my invention, and desire to secure by Letters Patent, is—

The combination of the sets of spokes *a* and *b*, part O *o o'* of the hub, elastic washer or ring E, and adjustable socketed ring B, substantially as and for the purpose specified.

GEORGE NELSON.

Witnesses:
E. G. GEISENDORFF,
JAMES DAWSON.